(No Model.)

J. H. COON.
METHOD OF APPLYING BARBS TO FENCE WIRE.

No. 292,205. Patented Jan. 22, 1884.

Witnesses:
William A Park
F. W. Lehman

Inventor,
James H. Coon

UNITED STATES PATENT OFFICE.

JAMES H. COON, OF DES MOINES, IOWA.

METHOD OF APPLYING BARBS TO FENCE-WIRE.

SPECIFICATION forming part of Letters Patent No. 292,205, dated January 22, 1884.

Application filed November 22, 1883. (No model.)

*To all whom it may concern:*

Be it known that I, JAMES H. COON, a citizen of the United States, residing at Des Moines, in the county of Polk and State of Iowa, have invented a new and useful Improvement in Methods of Applying Barbs to Fence-Wire, of which the following is a specification.

My invention relates to the manner of coiling barb-wire around a main fence-wire; and it consists in rotating the barb-wire around the main fence-wire at the point where the barb is applied in one direction and simultaneously coiling the free end of the barb-wire around the main wire in the opposite direction, and afterward cutting off the barb from the barb-wire.

Figure 1:
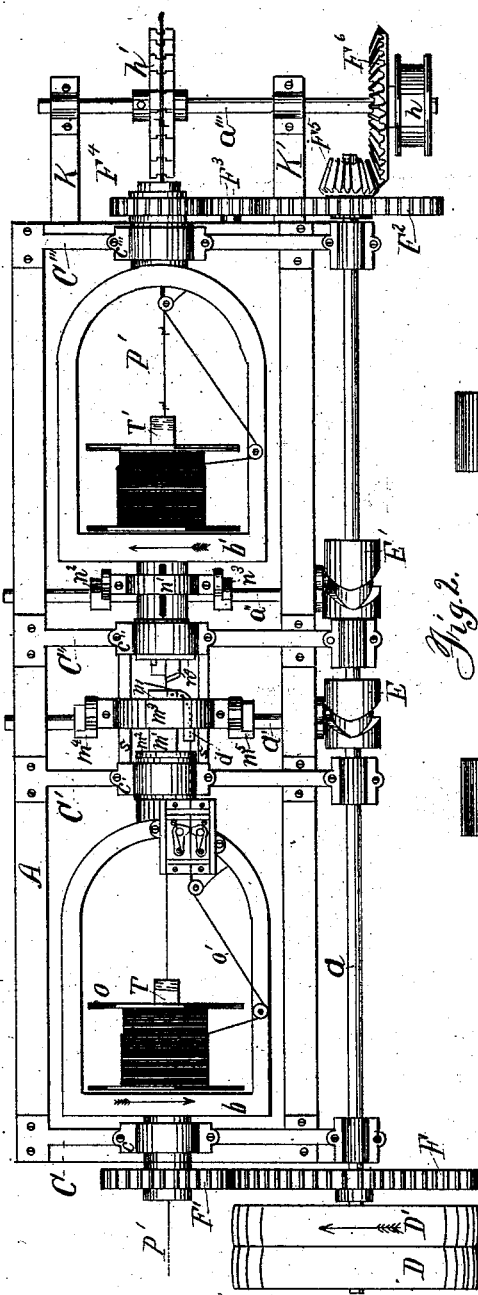
Figure 2:
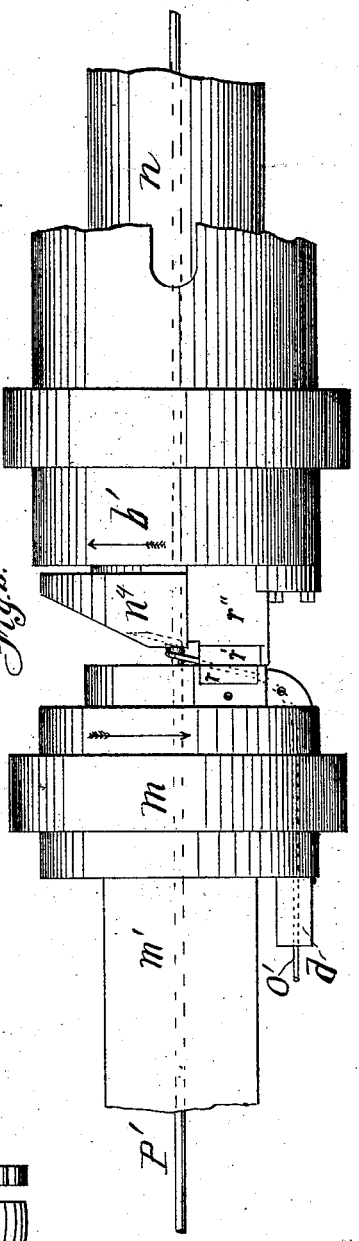

In the accompanying drawings, Figure 1 is a plan view of a wire-barbing machine adapted to apply barbs in accordance with my new method. Fig. 2 is an enlarged view of the parts directly engaged in coiling the barb-wire around the main wire and in cutting off the barb-wire.

The machine shown in Fig. 1 in plan is provided with means for supporting and guiding two main fence-wires and a barb-wire; means for advancing one of said main fence-wires directly and continuously forward through the barbing mechanism, and means for cabling the same with the other main wire; and is also provided with a rotating and reciprocating head carrying a cutting-tool and a curved wire-guide employed to direct the barb-wire across the main fence-wire; means for reciprocating the head, and means for holding the barb-wire and projecting it across the main fence-wire as required to form barbs thereon; also a rotating and reciprocating barb-coiler for grasping the free end of the barb-wire and coiling it around the main fence-wire, and a rotating cutting-tool to co-operate with the tool carried in the rotating and reciprocating head in severing the barb-wire.

In Fig. 2, $m$ is a rotating and reciprocating head carrying a cutting-tool, $r$, adjustably secured to a seat made integral with the head. $d$ is a curved wire-guide secured by a cap-screw in a slot provided in the head $m$ for its reception and guides the barb-wire $o'$ diagonally across the edge of cutter $r$ and across the main fence-wire $p'$ at an oblique angle. $b'$ is a section of the rear end of rotating flyer, and has secured to its rear face a seat, $r''$, to which is adjustably attached a cutter, $r'$. $n$ is a rotating and reciprocating tube, secured and operated in the rear end of flyer $b'$, and has a barb-coiler, $n^4$, attached to the rear end thereof. This tube $n$ is cut away, so as to inclose and slide past the seat $r''$ on either side, and is rotated by the flyer $b'$ in the direction indicated by the arrow. Head $m$ reciprocates in the direction of its longitudinal axis and is rotated in the direction indicated by the arrow. When head $m$ recedes, the barb-wire is projected across the main fence-wire $p'$, and when it advances the barb is coiled around the main wire, and at the end of the forward stroke the barb is severed from the barb-wire by an angular cut, so as to leave the barb and the free end of the barb-wire sharp.

The barb-wire is coiled around the main fence-wire as follows: Head $m$ recedes in advance of tube $n$, and the barb-wire thrust across the main wire does not come in contact with the barb-former $n^4$ during the backward stroke of head $m$, and cam E is so constructed that at the end of each throw of head $m$ it remains for an instant before returning. During this instant at the end of the backward stroke tube $n$ is brought backward, so that the barb-former $n^4$ catches the free end of the barb-wire. As $m$ advances forward, it moves with the same speed as the main wire, and tube $n$ moves with a slightly increased speed, as required, to lay the successive coils of the barb adjacent to each other. As head $m$ and flyer $b$ rotate in one direction and carry the barb-wire around the main wire one complete revolution during the advance movement of $m$, and as tube $n$, in flyer $b'$, rotates one complete revolution in the opposite direction, the combined action of head $m$ and barb-former $n^4$ coils the free end of the barb-wire twice around the main wire. As the barb is coiled on the fence-wire, the free end will be shortened, and when the coiling is completed the free end is left projecting from the main wire just sufficient to form a barb or repelling point.

The surface of the barb-former $n^4$, which comes in contact with the barb-wire, is made concave or grooved, to retain the barb and to prevent it from slipping off. It is, however, so constructed that when the barb has been completely coiled and cut off it passes freely from the barb-former into and through the axis of tube $n$. At the end of the forward throw of head $m$ and tube $n$ they occupy the position shown in Fig. 2, and the cutting-tools $r$ and $r'$ now sever the barb-wire and head $m$ recedes as before.

The cutting-tools should be arranged to cut the barb the instant that head $m$ has reached the end of its forward movement.

During the operation of applying the barb the cable will be formed by the flyer $b'$ by carrying the wire mounted in said flyer around and combining it with the barbed strand.

For a more detailed description of the machine I refer to my application now pending, No. 104,588, filed August 24, 1883, which fully describes one machine by which this method of applying barbs may be executed.

What I claim as new, and desire to secure by Letters Patent, is—

The process of manufacturing barbed fence-wire, which consists in rotating the barb-wire around the main fence-wire in one direction and simultaneously coiling the free end of the barb-wire around said main wire in the opposite direction and afterward severing the barb-wire, substantially as described.

JAMES H. COON.

Witnesses:
  WM. A. PARK,
  F. W. LEHMANN.